United States Patent Office 3,145,975
Patented Aug. 25, 1964

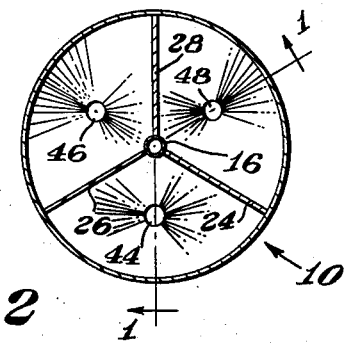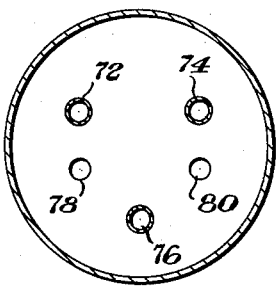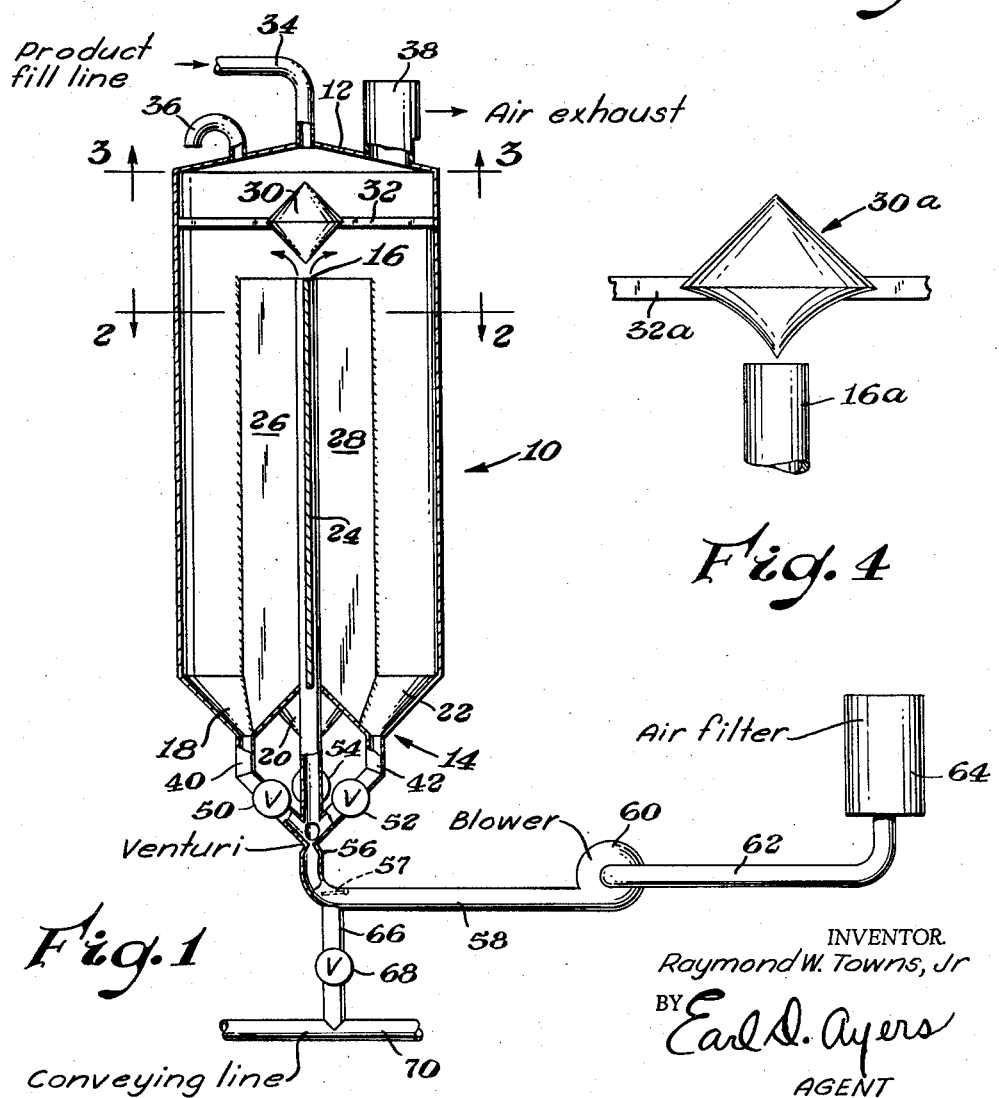

3,145,975
BLENDING APPARATUS
Raymond W. Towns, Jr., Plaquemine, La., assignor to The Dow Chemical Company, Midland, Mich., a corporation of Delaware
Filed Nov. 14, 1962, Ser. No. 237,482
11 Claims. (Cl. 259—4)

This invention relates to blending apparatus and particularly to dry product blenders in which the material to be blended may be transported in a stream of gas.

Many applications exist where it is desirable and/or necessary to blend together more than one type, color, or grade of material to produce a composite blend which has predetermined characteristics.

For example, various types of wheat may, when blended and milled, result in a flour which has characteristics which are unique or are more desirable than those of flour made of any one variety of wheat.

Another example of blending which is often done is to blend granular materials of various grades or colors to form a composite mass of granules which have desirable characteristics.

Although some blenders are available for blending free flowing materials many of these are either expensive to purchase, maintain, and/or operate, or do a less than adequate blending job.

Accordingly, a principal object of this invention is to provide an improved blender for free flowing particulate materials.

Another object of this invention is to provide an improved, dry product blender which is capable of blending materials at a rapid rate.

A further object of this invention is to provide an improved dry product blender for particulate materials which is simple to construct and to operate.

In accordance with this invention, there is provided a chamber having generally symmetrically disposed vertical partitions therein which divide the chamber into a plurality of compartments.

Means are provided for withdrawing particulate material from the bottom part of the compartments and pneumatically transporting the material generally along the longitudinal axis of the chamber to the upper part of the chamber where it is directed against a distribution surface from which the material is dispersed in random manner into the compartments of the chamber.

The material is re-circulated and dispersed until the product mix in each compartment is more or less identical.

Usually the chamber is initially filled by feeding the particulate material into the top of the chamber and onto a dispersing plate or by other means causing it to pass into the various compartments.

The invention, as well as additional objects and advantages thereof, will be best understood when the following detailed description is read in connection with the accompanying drawings, in which:

FIG. 1 is a side elevational view, partly broken away and in section, of blending apparatus in accordance with this invention;

FIG. 2 is a sectional view taken along the line 2—2 of FIG. 1;

FIG. 3 is an alternative sectional view taken as along the line 3—3 of the top assembly for use with the apparatus of FIG. 1; and FIG. 4 is a fragmentary elevational view, partly in section, of an alternative granular product dispersing device for use in accordance with this invention.

Referring to the drawing and particularly to FIGS. 1 and 2, there is shown an elongated vertically disposed hollow chamber, indicated generally by the numeral 10, which is, except at its upper end part 12 and lower end part 14, generally tubular in shape and symmetrically disposed around its longitudinal axis.

A hollow pipe-like member 16 extends upwardly through the chamber 10 from below the lower end part 14. The member 16 is coaxial with the longitudinal axis of the chamber 10 and extends, usually, about three quarters of the distance towards the upper end part of the chamber.

The lower end part 14 of the chamber 10 has three hoppers 18, 20, 22 extending downwardly therefrom. The upper or top end part 12 of the chamber is a more or less conventional closure, e.g. a more or less conical member (wide base as compared to the height of the closure member).

Partitions 24, 26, 28 extend from the pipe-like member 16 to the side wall of the chamber 10 and to the side walls of the hoppers 18, 20, 22. As may be seen more clearly in FIG. 2, the partitions are symmetrically disposed with respect to and parallel to the longitudinal axis of the chamber. The upper end of the partitions usually, but not necessarily, extends at least near to the upper end of the pipe-like member 16. The partitions 24, 26, 28 form three compartments within the chamber.

A dispersing member 30 having the form of a pair of cones joined base-to-base is supported by brackets 32. The brackets 32, which extend between the member 30 and the walls of the chamber 10, hold the dispersing member 30 above the upper end of the pipe-like member 16 with the apices of the dispersing member 30 being substantially aligned with respect to the longitudinal axis of the pipe-like member 16. The diameter of the bases of the cones (the central part of the member 30) is substantially larger than the diameter of the member 16. A product fill line 34, substantially smaller in diameter than the diameter of the dispersing member 30, extends through the upper end part 12 in alignment with the longitudinal axis of the dispersing element 30.

The upper end part 12 also has at least one vent 36 and an air exhaust filter 38 coupled thereto and communicating with the interior of the chamber.

Each of the hopper sections 18, 20, 22 at the lower end of the chamber discharges into an individual conduit or line. Lines 40, 42, coupled to the hoppers 18, 22, respectively, are shown. The discharge line from the hopper 20 lies behind the pipe-like member 16 and cannot be seen. However, in FIG. 2, the bores 44, 46, 48, to which the individual discharge lines are coupled, may be seen. Each of the discharge lines has a valve 50, 52, 54 (the valves 50, 52 being disposed along and coupled to lines 40, 42, respectively, and the valve 54 being disposed along and coupled to the discharge line (not visible in FIG. 1) from the hopper 20.

Each of the discharge lines is coupled to the pipe-like member 16, the lines intersecting the member 16 at an angle of about 45 degrees with respect to the longitudinal axis of the member 16, each being separated radially from the other by an angle of about 120 degrees. The discharge lines each intersect the member 16 at about the same point along its length.

The pipe-like member 16 has a constricted part 56 at the point along its length where the discharge lines (40, 42 along the line behind member 16) intersect it. The part of the member 16 which lies below the constricted part 56 is coupled through the line 58 and flap gate valve 57 to a blower 60. The blower 60 has its intake coupled through the line 62 to the air filter 64. In addition, the part of the member 16 which lies below the constricted part 56 is coupled through the line 66 and valve 68 to a pneumatic conveying line 70.

In operation the particulated material to be blended is fed into the top of the chamber 10 through the product fill line 34, impinges on the upper conical surface of the dispersing element 30 and is randomly distributed into the compartments formed by the partitions 24, 26, 28. Normally the valves 50, 52 and 54 are closed while the chamber is being filled with particulated material.

When the material in the compartments of the chamber 10 are to be blended, the flap gate valve 57 is opened, the valve 68 is closed and the blower 60 is operated to force a stream of air through the line 58, constricted section 56, and up through the member 16. The valves 50, 52 and 54 in the various discharge lines are then opened (preferably to permit a balanced flow through each valve), permitting particulated material to enter the pipe-like member 16. The upwardly directed air flow through the member 16 is adjusted to exceed the falling rate of the particulated material, thereby carrying particulated material from the three discharge lines up to the member 16 with sufficient velocity to cause them to impinge on the lower conical surface of the dispersing element 30 and be dispersed in a random manner into the compartments in the chamber. Circulation of the particulated materials is continued until the proper blending of the contents of the chamber is accomplished. Usually viewing parts (not shown) are provided in the various hopper discharge lines in order that the appearance of the blend in each discharge line may be observed.

When blended material is to be discharged from the chamber, the blower 60 is shut off, the flap gate valve 57 closed, and the star valve 68 operated (with the valves 50, 52 and 54 open) to convey particulated material into the conveying line 70.

An alternative arrangement of product fill lines 72, 74, 76 is shown in FIG. 3. Instead of a single fill line (34 in FIG. 1), three fill lines are used, one fill line supplying particulated material to each of the three compartments in the chamber 10. The fill lines 72, 74, 76 may be fed from a common line or from separate lines. This arrangement, when each fill line is fed from a different source, results in the blended material becoming substantially uniform in a shorter time because there is less stratification of material in a uniform manner in the compartments of the blender as they are filled. Vent lines 78, 80 are provided.

In the embodiment of dispersing element 30a shown in FIG. 4, the element 30a is disposed, by means of brackets 32a, in the same manner as is the element 30 shown in FIG. 1. The configuration of a diametrical longitudinal cross section, however, is such that the lower part of the element does not have straight sides. Instead, the sides, as thus viewed, are curved concave inwardly slightly to assure that all particulate material blown from the upper end of the member 16 will be deflected towards the sides of the chamber and fall in a random manner into one of the compartments.

In one blender made in accordance with this invention the chamber is 44 feet 6 inches high, exclusive of the hoppers, and is 10 feet in diameter. The partitions 24, 26, 28 extend to within 6 feet of the top of the chamber, the pipe-like member 16 extending 2 feet above the partitions. The member 16 has an inside diameter of about 1 foot. The diameter of the dispersing element 30 is about 4 feet.

With a conventional standard squirrel cage blower driven by a 25 horsepower motor, and delivering 5,700 cu. ft. per minute at 16 inches static pressure water gauge, coupled to the constricted part 56, 100,000 pounds of polyethylene pellets were thoroughly blended in about two hours. The ease with which blending is accomplished using a blower of relatively small capacity is attributed to the fact that the pipe-like member 16 is of relatively large diameter (reducing friction losses) and because the member 16 is symmetrically disposed in the chamber and provides a short return or recirculating path for the particulated materials being blended.

It is obvious that the blending apparatus of this invention may be used in combination with closed system air or inert gas recirculation if such is desirable for a particular application. Automatic controlling of the valves, blower, etc., is also contemplated.

It has been found that blending occurs as the material enters the pipe 16 just above the constricted part 57 and in the riser or pipe-like member 16 as well as when the particulated material impinges on the dispersing element. It is desirable that the particulated materials being blended be approximately of the same size and mass in order to more easily achieve a good blend.

While the invention has been described in connnection with a chamber having three compartments and three discharge lines, blenders having two or more compartments are practicable. When only two compartments are provided the time required to achieve a specific degree of blending is longer than when the blender contains three compartments.

Blenders having more than three compartments can achieve a specified degree of blending in a shorter period of time than if fewer compartments were used, but the added cost of additional compartments, hoppers, valves, etc. often makes the resultant reduction in blending time uneconomical from a practical operational standpoint.

What is claimed is:

1. Blending apparatus comprising a hollow chamber having side walls, an upper end, a lower end, a longitudinal axis, and a plurality of compartments therein, said compartments being separated one from another by a plurality of partitions, said partitions being generally parallel with the longitudinal axis of said chamber, the partitions extending from the lower end of said chamber a substantial part of the way to said upper end, each of said compartments having a hopper communicating with the lower part, a hollow riser pipe, said riser pipe being disposed generally parallel with and along the longitudinal axis of said chamber and extending through the lower end of said chamber and also at least nearly to the upper end part of said partitions, a constricted pipe section having an upper end and a lower end, said constricted pipe section being coupled to and aligned with said riser pipe below said hoppers, a plurality of discharge lines, one of said discharge lines being coupled between each of said hoppers and said riser pipe at the upper end of said constricted part, the coupling of the discharge lines to the riser pipe being symmetrical with respect to a plane perpendicular to the longitudinal axis of said chamber, valved conduit means coupled to the lower end of said constricted part for sequentially applying gas under pressure through said constricted part in one direction and for withdrawing material from said chamber through said constricted part in another direction, means for feeding particulated materials into said compartments from the upper end of said chamber, and means for randomly dispersing into said compartments particulated materials which are blown from said riser pipe as gas is applied under pressure to said constricted part.

2. Apparatus in accordance with claim 1, wherein said compartments are substantially equal in size.

3. Apparatus in accordance with claim 1, wherein said partitions each extend between said riser pipe and a wall part of said chamber.

4. Apparatus in accordance with claim 1, wherein flow control valves are provided in each of said discharge lines.

5. Apparatus in accordance with claim 1, wherein said upper end of said chamber is closed and has at least one vent therein.

6. Apparatus in accordance with claim 1, wherein said means for applying gas under pressure includes a blower.

7. Apparatus in accordance with claim 1, wherein said means for randomly dispersing particulated materials blown from said riser pipe comprises a generally conical surface of substantially wider diameter than said riser pipe, said surface being disposed in spaced apart axially aligned relationship with respect to said riser pipe.

8. Apparatus in accordance with claim 1, wherein the diameter of said riser pipe is about $\frac{1}{10}$th the diameter of the chamber, said chamber being cylindrical along a major part of its length.

9. Apparatus in accordance with claim 1, wherein the means for feeding particulated materials into said compartments comprises a separate feed line directed into each compartment.

10. Apparatus in accordance with claim 1, wherein there are three compartments.

11. Apparatus in accordance with claim 1, wherein said means for feeding particulated materials into said compartments comprises an axially disposed feed line at said upper end directed at a dispersing member.

References Cited in the file of this patent

UNITED STATES PATENTS

| | | |
|---|---|---|
| 1,000,689 | Paterson | Aug. 15, 1911 |
| 1,026,578 | Hammond | May 14, 1912 |
| 3,028,681 | Jorman | Apr. 10, 1962 |